No. 733,113. PATENTED JULY 7, 1903.
A. ANDERSON.
BELT OR CHAIN TIGHTENER.
APPLICATION FILED FEB. 26, 1903.
NO MODEL.
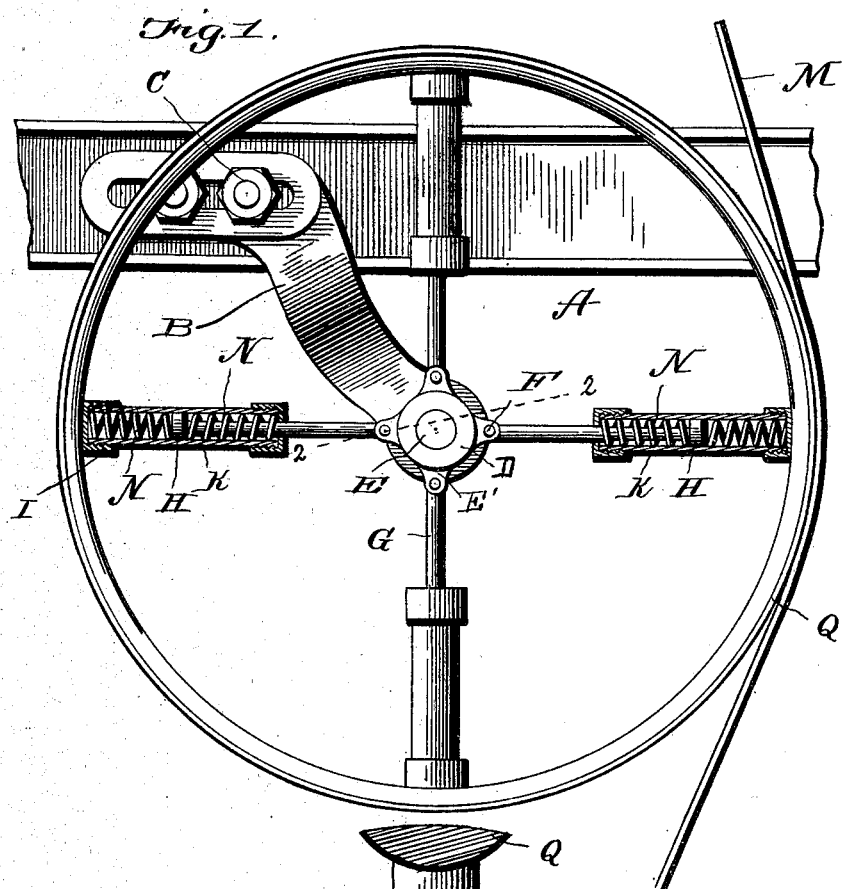
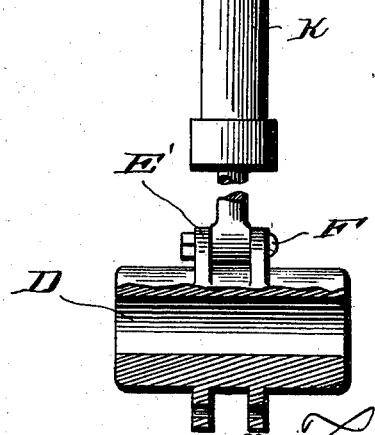
Witnesses
R. A. Boswell.
A. L. Hough.
Inventor
Alfred Anderson,
By Franklin N. Hough
Attorney.

No. 733,113.

Patented July 7, 1903.

UNITED STATES PATENT OFFICE.

ALFRED ANDERSON, OF LAKE LILLIAN, MINNESOTA.

BELT OR CHAIN TIGHTENER.

SPECIFICATION forming part of Letters Patent No. 733,113, dated July 7, 1903.

Application filed February 26, 1903. Serial No. 145,288. (No model.)

*To all whom it may concern:*

Be it known that I, ALFRED ANDERSON, a citizen of the United States, residing at Lake Lillian, in the county of Kandiyohi and State of Minnesota, have invented certain new and useful Improvements in Belt or Chain Tighteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in belt or chain tighteners for wheels or pulleys of various kinds; and it consists in the provision of a wheel mounted upon a shaft and having yielding connections whereby the tension of a belt passing about the same may be regulated.

The invention consists, further, in various details of construction and in arrangements of parts, which will be hereinafter fully described and then specifically defined in the appended claim.

My invention is illustrated in the accompanying drawings, which, with the letters of reference marked thereon, form a part of this application, and in which—

Figure 1 is a side elevation of the wheel with connected parts shown in section. Fig. 2 is a cross-sectional view on line 2 2 of Fig. 1.

Reference now being had to the details of the drawings by letter, A designates a stationary beam, and B represents a bracket-arm, which is held thereto by means of bolts C and made to be adjustably held in different positions upon the beam. Said arm has a hub D for the reception of a shaft E, and integral arms E' project radially from said hub, and said arms are apertured to receive a bolt F, upon which the inner ends of the spokes G are mounted. Each of said spokes has a piston H at its outer end adapted to travel in the cylinder K, the open ends of said cylinders being closed by means of caps I, that have threaded connection with said cylinders. Interposed between said caps and the opposite faces of the pistons H are the springs N, adapted to act against the opposite faces of the piston to equalize the pressure which may be applied to the wheel. In the drawings I have shown four of the rods or spokes G, each of which has mounted upon the end thereof a piston traveling in a cylinder, and M designates a belt passing about the circumference of the wheel Q.

By the provision of an apparatus embodying the features of my invention when used in connection with a belt as a tightener or idler the wheel may be yieldingly held against the belt, and in case of any slackage in the belt the springs will take up the slackage and will hold the rim of the wheel yieldingly against the belt, making the latter at all times taut.

While I have shown my apparatus as applied to a pulley about which a belt travels, it will be understood that it may be used for various other purposes for which it may be found to be adapted, and when employed as a belt-tightener it will equalize the strain upon the belt, and the bracket-arm may be moved into different positions and held to the stationary beam when adjusting the same to tighten or loosen the belt.

Having thus fully described my invention, what I claim as new, and desire to secure by Letters Patent, is—

A belt-tightener comprising a hub, an adjustable bracket-arm on which said hub is mounted, lugs projecting from said hub, and pivotal pins carried by the lugs, a circular rim, cylinders connected thereto, pistons working in said cylinders, springs interposed between the ends of said cylinders and the pistons, the stems of said pistons pivotally connected to said lugs, the apparatus so arranged that the rim of the wheel will be yieldingly held in contact with a belt, whereby the same may be kept taut, as shown and described.

In testimony whereof I hereunto affix my signature in presence of two witnesses.

ALFRED ANDERSON.

Witnesses:
SAM SAKS,
DANIEL OLSON.